United States Patent [19]

Clarke

[11] Patent Number: 4,848,018
[45] Date of Patent: Jul. 18, 1989

[54] FISH-HOOK COUPLING AND RELEASE DEVICE

[76] Inventor: John F. Clarke, P.O. Box 2045, Dawson Creek, British Columbia, Canada, V1G 4K8

[21] Appl. No.: 264,799

[22] Filed: Oct. 31, 1988

[51] Int. Cl.⁴ .............................................. A01K 91/04
[52] U.S. Cl. .................... 43/43.12; 43/44.83; 43/44.92
[58] Field of Search ............. 43/43.12, 43.16, 44.83, 43/44.86, 44.92, 42.38

[56] References Cited

U.S. PATENT DOCUMENTS

| | | | |
|---|---|---|---|
| 3,210,883 | 10/1965 | Ulsh | 43/43.12 |
| 3,518,784 | 7/1970 | Kling et al. | 43/43.12 |
| 3,648,399 | 3/1972 | Lloyd | 43/43.12 |
| 4,205,479 | 6/1980 | Björshol | 43/44.86 |
| 4,267,659 | 5/1981 | Grasso | 43/43.12 |
| 4,291,485 | 9/1981 | Koller | 43/43.12 |

FOREIGN PATENT DOCUMENTS

| | | | |
|---|---|---|---|
| 587043 | 11/1959 | Canada | 43/43.12 |
| 1111249 | 10/1981 | Canada | 43/43.12 |

Primary Examiner—Nicholas P. Godici
Assistant Examiner—William Scott Andes

[57] ABSTRACT

A releasable fish-hook assembly is provided herein. The assembly includes a hollow, double-open-ended cylindrical retainer. A fish-hook is modified to have an arrowhead, which may or may not be deformable, which is attached thereto, the arrowhead being capable of passing through the central core of the hollow cylindrical retainer in one direction only. Connecting means are provided which connect the fish-hook to the arrowhead, such means being adapted to break to release the arrowhead from the fish-hook when a force on the fish-hook exceeds a pre-set limit.

23 Claims, 2 Drawing Sheets

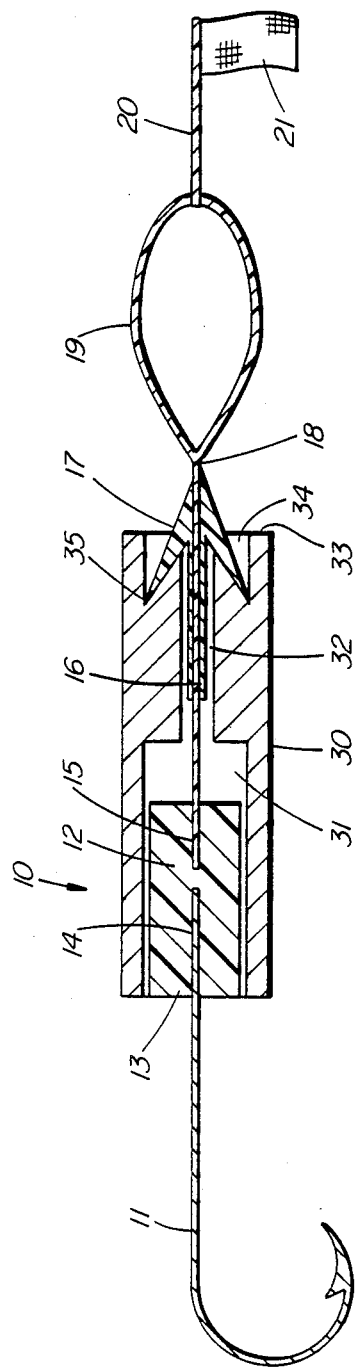
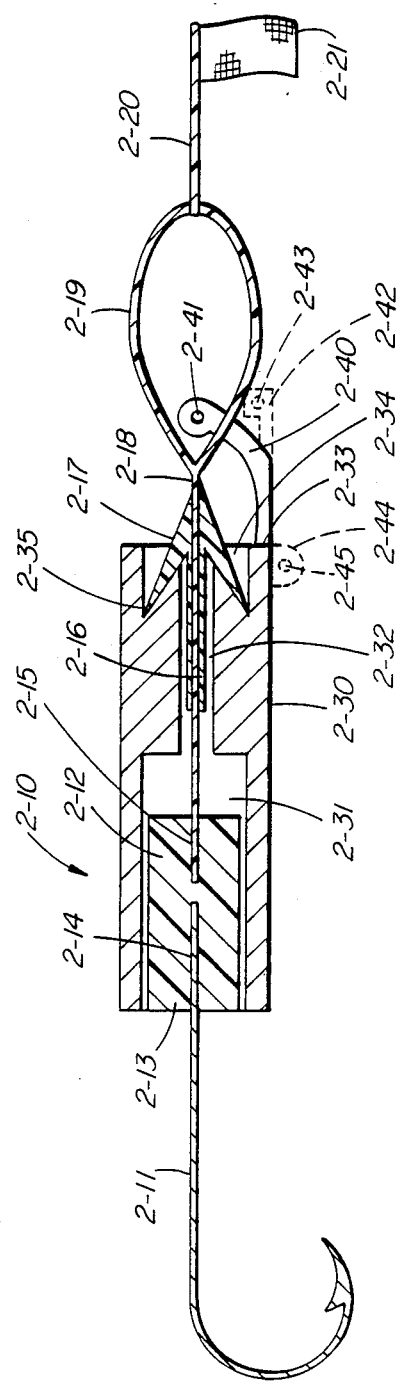
FIG. 1
FIG. 2

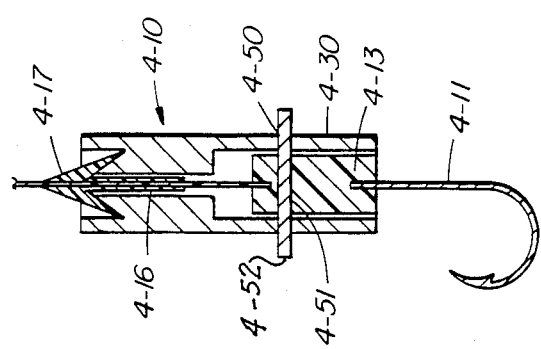
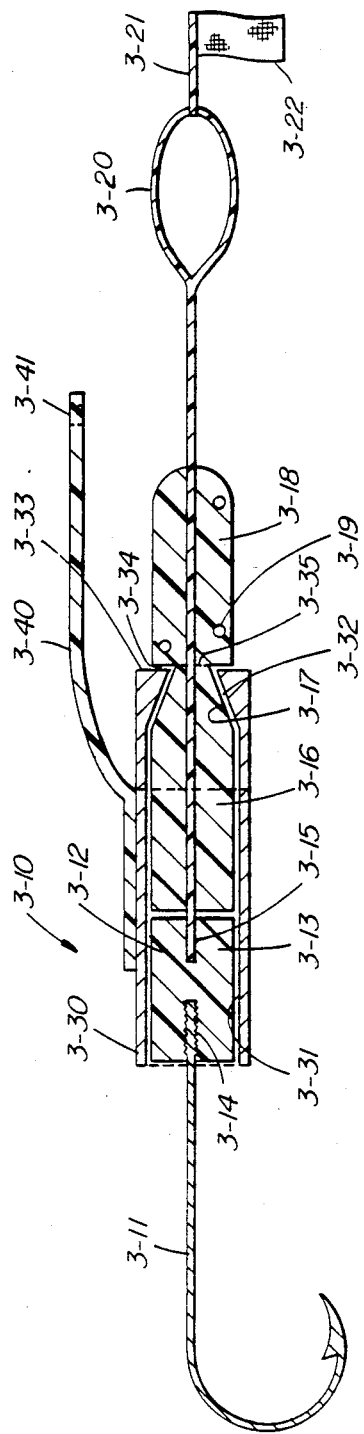
FIG. 3
FIG. 4

FISH-HOOK COUPLING AND RELEASE DEVICE

BACKGROUND OF THE INVENTION (a) Field of the Invention

This invention relates to a fish-hook assembly which will release itself, e.g. from a fish or from an obstacle.

(b) Description of the Prior Art

Increasingly fish stocks are being managed to conserve populations. Some management tools are size restrictions on the fish that may be retained and a limit to the number of fish in possession. These two regulatory functions make it implicit that some fishes caught must be released from the angler's line. Obviously the object is to release the fish so that it will live and remain a part of the population. There is also, because of catch limits, a considerable amount of sorting on behalf of anglers to end up with the largest legal size fish possible. Thus catching and releasing or selective angling is very much a fact of life in most of the organized fishing world.

Although, in some special circumstances, barbless hooks are used which facilitate releasing a fish, the vast majority of angling is carried out using a barbed hook. Not infrequently, the released fish dies because of the handling and the removal of the hook. When the fish dies the whole object of "catch and release" is lost. In a considerable number of cases it is preferable to leave the hook in the fish's body which effects a quick release and much less physical damage. Ordinary steel fish-hooks will corrode away in a short time with no harm to the fish.

The patent literature is replete with self-releasable hooks. For example U.S. Pat. No. 3,210,883 patented Oct. 12, 1965 by G. Ulsh provided a fish-hook releasing device. The patented device included a fish-hook element and an anchor member. The fish-hook element included an elongated shank having a hook on one end and a holding bead affixed to the opposite end thereof adapted to be held by the anchor member. The holding head included an enlarged outer end portion, an extended cylindrical portion of less diameter than the enlarged outer end portion and having means for attaching the shank thereto. The anchor member included a tubular shaped, one-piece body of pliable rubber-like material of predetermined elasticity having an elongated aperture of a smaller diameter than the enlarged outer end portion of the holding head. The aperture extended inwardly through one end of the body portion and into the interior of the body portion. The anchor member had an inner cavity of larger diameter than the elongated aperture and connected with the inner end of the other aperture. The reduced cylindrical portion of the holding portion of the holding head was substantially the same length and diameter as the aperture in the anchor member. The adjacent end of the inner, enlarged portion of the holding head was positioned to engage the anchor member about the outer end of the aperture. Means were carried on the opposite end of the anchor body member opposite the aperture for attaching the same to a fishing device.

U.S. Pat. No. 3,518,784 patented July 7, 1970 by E. A. Kling provided a lure characterized by an elongated body which had a forward end and a rearward end. A shaft member or equivalent component part was connected with an projected axially beyond the forward end of the lure and permitted the angler to attach the trailing end of a regular fishing line thereto. The fish-hook used was more or less conventional in construction. Separable pull responsive means provided an operating connection between the forward end of the shank and a cooperating rearward end portion of the body of the lure. The pull responsive means enabled separation and release of the hook when the hook was snagged on a rock or an obstruction and cannot be freed. The angler, when he is not fishing, could also decide at will to catch hold of and disconnect the fish-hook so that it could be replaced with an alternate fish-hook.

U.S. Pat. No. 3,648,399 patented Mar. 14, 1972 by K. R. Lloyd provided a device for releasing a fish-hook from a fishing line when engaged with a fixed object in the water, without loss of any portion of the fishing equipment other than the fish-hook itself. The patented device had a tubular housing, one end of the housing being open and the other end having a passageway through which a plunger mounted in the housing reciprocated and which was spring loaded to be urged toward the open end of the housing. An outwardly-urged, hook-engaging means was provided on the housing adjacent the open end of the housing. Means were provided for releasably maintaining the hook-engaging means in engaging position.

Canadian Pat. No. 381,250 patented May 9, 1939 by B. Whitis provided a fish-hook releasing device including a hook having a rigid shank, and means interposed between the hook shank and line to jar the hook loose from any obstruction on which it may be caught in casting. Such means included a member having a single universal connection with the shank at the end remote from the hook and a light plunger connected with the rod at the opposite end. A body member was formed with an internal bore traversed by the plunger and closed at its opposite ends. The plunger rod slidably passed through one of the open ends of the body member. A compression spring was disposed in the bore in surrounding relation to the plunger rod, with one end bearing on the plunger and the other end bearing on that extremity of the bore through which the rod passed. Means were provided for connecting the line to the body member at the opposite end from the plunger rod. Upon engagement of the hook with an obstruction, a pull on the line may retract the body member so that on quick release of the line it may engage the plunger with a sudden impact to dislodge the hook.

Canadian Pat. No. 505,074 issued Aug. 17, 1954 to E. P. Cox provided a device for disengaging fish-hooks. The patented device included a frame having means enabling the device to travel along a line attached to a caught fish-hook or to another caught object. A hammer mechanism was mounted on the frame for movement from a retracted position to a projected position and vice versa. Resilient means was provided for continually urging the hammer mechanism to the projected position. A latch mechanism was also employed for holding the hammer mechanism in retracted position against the action of the resilient means. When the device was mounted on the fish line, the latch mechanism was set to hold the hammer mechanism in retracted position. When the device contacted the caught fish-hook, automatic means was actuated to release the latch mechanism and thereby to effect projection of the hammer mechanism by the resilient means. Projection of the hammer mechanism resulted in its striking the caught fish-hook, and this resulted in effecting release of the fish-hook.

Canadian Pat. No. 587,043 issued Nov. 17, 1959 to N. L. Cook provided a fish-hook release. The patented fish-hook release included a connecting device which included a longitudinally-bored body. An end portion of the line was slidable through the bore in the body and was operatively connected to a collar which was slidable on the body toward and from a second collar also carried by the body and which was resisted by a coil spring which was normally expanded and surrounded the body between the collars. The end of the body which was adapted to accommodate the shank of the fish-hook was provided with a pair of cooperating jaws, one stationary and the other movable. The jaws were maintained normally closed by the encircling spring biased collar.

Canadian Pat. No. 1,111,249 issued Oct. 27, 1981 to Bernard Cote provided a tension release coupling from a fish-hook. The patented coupling assembly included a resilient coupling member attachable to the fish line and a connector member which is part of the fish-hook assembly and releasably coupling with the coupling member. The coupling member consisted of a one piece body of resilient plastic and non-compressible material, the body being elongated, having opposite sides and two opposite ends, and having a slot extending longitudinally thereof from one end towards but short of the other end, the slot opening at the opposite sides and at the one end and defining two elongated arms spaced from each other and integrally interconnected by a transverse bight portion at the other end and having an intermediate cavity. The connector member included an enlarged head removably insertable into the slot, the movement continuing until the head fully engaged the cavity, the head having an external surface complementary to the shape of the cavity.

Devices have also been patented to provide for the release of a weight or sinker from a fishing line. In one such device, shown in U.S. Pat. No. 4,267,659 patented May 19, 1981 by R. Grasso, a sinker release apparatus was provided. The patented apparatus had a body and a sinker releasably held thereto and included a first notch in the body and a release mechanism which was mounted on the body. A portion of the release mechanism was adapted for pivotal movement within the notch. Such pivotal movement was responsive to actuation of the release mechanism by a leader line attachable to the body. The release mechanism was actuated between a releasing position and holding position. The sinker had a first hook member which was receivable within the notch and held therewithin by the release mechanism portion during the holding position. A mounting means was provided for pivotally mounting the sinker on the body and for permitting release of the sinker from the body in response to pivotal movement of the sinker.

U.S. Pat. No. 4,291,485 patented Sept. 29, 1981 by J. Koller provided an automatically releasing mounting system for releasing a weighting member from a fishing line. The mounting system included a receptacle resiliently biased into essentially conical shape. Wall portions of the receptacle were interconnected by a pivotal joint near the upper end thereof, while latch apparatus was provided releasably to connect the lower ends of the wall portions. The latch apparatus include a latch member having a wing formed integral thereto. When the receptacle hit the surface of the water, the relative movement between the water and the wing portion of the latch member caused moving of the latch member out of the associated latch-catch.

SUMMARY OF THE INVENTION (a) Aims of the Invention

In spite of these patented devices, there is still a need for a tension release coupling assembly which connects the fish-hook to the remainder of the fishing line, including the lure or lures, whereby this remainder of the line is allowed to be released by tension thereon.

Accordingly, a principal object of this invention is to provide such as coupling for a fish-hook element that will require very little effort either to attach it to the anchor or to remove it therefrom.

(b) Statements of Invention

By this invention a fish-hook coupling and release device is provided comprising: (a) a hollow double-open-ended cylindrical retainer; (b) a fish-hook having an arrowhead attached thereto, the arrowhead being capable of passing through the central core of the hollow cylindrical retainer in one direction only; (c) breakable means connecting the arrowhead to the fish-hook for releasing the arrowhead from the fish-hook when a force on the fish-hook exceeds a pre-set limit.

This invention also provides a fish-hook coupling and release device which includes means associated with the retainer for enabling the securement of the snap ring of a lure thereto.

This invention also provides a fish-hook assembly and release device which includes an anti-twist device, e.g. aligned apertures in the retainer and the modified fish-hook, through which a pin is passed.

(c) Further Features of the Invention

The arrowhead may be formed of a synthetic plastic material, e.g. nylon or polyethylene. The shaft of the arrowhead may be thin, cylindrical shaft formed of a frangible material. The shaft may be connected directly to a cylindrical base which is secured to adhered to the unbarbed end of the fish-hook, or it may be connected to the unbarbed end of the fish-hook by means of a length of fishline.

The cylindrical retainer is made of rugged material, preferably of aluminum or steel, and it preferably includes a first bore of a first diameter and a second bore of lesser diameter terminating in a seating well. When the cylindrical retainer has such structure, the arrowhead would comprise a thin cylindrical shaft connected to a cylindrical base which is secured or adhered to the unbarbed end of the fish hook by releasable means.

The means for releasing the arrowhead from the fish-hook is determined by the strength of the connecting member. Such connecting member preferably is a length of nylon fish line of known tensile strength, so as to break at a predetermined pull.

The tip of the arrowhead may be provided with a fingerloop ring attached to a threader tail e.g. by being molded to a nylon fish line, in order to aid in assembling the retainer/fish-hook assembly.

In one embodiment of this invention, the extension on the shank of the fish-hook to provide the arrowhead is made of a synthetic plastic material, e.g. nylon, and is secured to the fish-hook by a tension sensitive link. Such link, e.g. a length of nylon fish line, will break at a predetermined pull of a set number of pounds. Thus the fish-hook can be matched to the fishing line so that the connection of the arrowhead to the fish-hook is slightly weaker than the fish line. Under such constraints, the fish-hook will separate before the fish line breaks, thus saving the lure and the rest of the angler's tackle.

In this embodiment of the invention, a conventional fish-hook is provided with an arrowhead at the unbarbed end thereof, the arrowhead being formed of a synthetic plastic material, i.e. polyethylene or nylon, which is linked to the shank of the fish hook, e.g. by being connected to a length of nylon fish line secured to a nylon cylinder which is linked to the shank of the fish hook, e.g. by being connected to a length of nylon fish line secured to a nylon cylinder which is extruded onto, or otherwise secured to the unbarbed end of the fish-hook. The attachment fits through a cylindrical retainer so that the arrowhead protrudes through the other end of the cylinder and the arrowhead then seats within a seating well fitted within the front face of the cylindrical retainer. The tip of the arrowhead is provided with a loop molded to a nylon line.

A fish may be released either by cutting off the arrowhead, or by breaking the link by pulling on the arrowhead while gripping the retainer. When this is done, the cylindrical retainer and the lure will fall away, leaving only the fish-hook in the fish. Once the lure is out of the way, the angler can decide to remove the fish-hook from the fish, or to release the fish with the fish-hook in place. If the attachment is cut where it is bonded to the fish-hook, the fish-hook may be removed, in some cases, by pushing the point of the fish-hook out of the flesh which results in the barb of the hook not doing the tearing damage that takes place when the fish-hook is extracted by backing it out.

The fish-hook coupling and release device in one preferred embodiment of this invention consists of the following parts: a hollow cylindrical retainer; a modified fish-hook; a synthetic plastic arrowhead whose shaft is bonded to the unbarbed end of the fish-hook and is frangible and/or tension sensitive; a fingerloop ring attached to the arrowhead, the ring being used to pull the arrowhead through the cylinder; a threader tail attached to the finger loop, the threader tail being the first thing inserted through the cylinder; and a tag bearing the tension value of the fish-hook, a diagram showing how to install the fish-hook and how to release it and a request not to litter.

The cylindrical retainer in this embodiment of the invention is made so that the end from which the fish-hook protrudes is of a larger internal diameter than the other end which retains the arrowhead. This wider internal diameter allows the fish-hook to enter the cylindrical retainer far enough to seat the arrowhead but no further. The cylindrical retainer is made of a suitable material, e.g. aluminum, which is strong enough to resist the strength of biting fish jaws. One of the functions of the cylindrical retainer is to protect the arrowhead shaft from being bitten off by a fish. The other end of the cylindrical retainer is provided with a circular seating grove in which the bottom ends of the prongs of the arrowhead will rest when tension is placed upon the fish-hook. The arrowhead is designed so that the shaft can be made to protrude forwardly from the cylindrical retainer, in order to permit its severance by means of a sharp instrument, e.g. a scissors. The finger loop attached to the arrowhead is the means by which the arrowhead can be pulled through the cylindrical retainer.

In another embodiment of the invention, the modified fishhook includes a cylindrical base secured to an unbarbed end thereof, a forward cylindrical extension provided with a mid, nipped-in frusto-conical arrowhead and a terminal nose, the cylindrical base being secured to the cylindrical extension by a frangible link. That device may be one in which the cylindrical base is molded of nylon directly into an unbarbed end of the fish-hook, wherein a length of nylon fish line is molded into the nylon cylindrical base, and wherein the length of nylon fish line is molded onto the cylindrical extension or may be one in which the cylindrical base is form molded of nylon and is secured onto a threaded end of the fish-hook, wherein a length of nylon fish line is molded into the nylon cylindrical base, and wherein the length of nylon fish line is molded onto the cylindrical extension. In either of these cases, the cylindrical retainer includes a main cylindrical base terminating in a converging, frusto-conical base, whereby the terminal end provides encircling, sprung arrowhead-retaining jaws.

The fish-hook coupling and release device includes means to secure a snap ring of a lure thereto. Such means can be a flexible arm terminating in an aperture, or a cantelevered arm terminating in an aperture, or a rigid arm terminating in an aperture, or an apertured ear.

BRIEF DESCRIPTION OF THE DRAWINGS

In the accompanying drawings,

FIG. 1 is a longitudinal cross-section of one embodiment of the fish-hook coupling and release device of this invention;

FIG. 2 is a longitudinal cross-section of a second embodiment of the fish-hook coupling and release device of this invention;

FIG. 3 is a longitudinal cross-section of a third embodiment of the fish-hook coupling and release device of this invention; and FIG. 4 is a schematic representation of a portion of a fourth embodiment of the fish-hook coupling and release device of this invention.

DESCRIPTION OF PREFERRED EMBODIMENTS (a) Description of FIG. 1

As seen in FIG. 1, the fish-hook coupling and release assembly 10 includes a conventional fish-hook 11 having an extension 12 thereon instead of the conventional eye. The extension 12 includes a cylindrical base 13, preferably extruded directly onto the unbarbed end 14 of the fish-hook. Within base 13 is a frangible link 15 which may be made of a thermoplastic material, e.g. polyethylene. Preferably, however, link 15 is formed of a length of nylon fishline of preselected tensile strength. The link 15 extends to a forward shaft 16, which terminates in an integral, four-prong, arrowhead 17. The tip 18 of the arrowhead 17 is provided with a fingerloop ring 19 which is molded to a nylon line threader tail 20, which terminates in an instruction tag 21.

The so-modified fish-hook is secured within a double-opened cylindrical retainer 30. Cylindrical retainer 30 includes a primary well 31 (to accommodate base 13) and a secondary bore 32 (to accommodate forward shaft 16). The front face 33 of the cylindrical retainer 30 includes a circular seating groove 34 (to accommodate the bottom ends of the prongs 35 of the arrowhead 17).

(b) Description of FIG. 2

The second embodiment of the invention seen in FIG. 2 is similar in most respect to the first embodiment, and where similar parts are described they will be identified by the prefix "2-". As seen in FIG. 2, the fish-hook coupling and release assembly 2-10 includes a conventional fish-hook 2-11 having an extension 2-12 thereon instead of the conventional eye. The extension 2-12 includes a cylindrical base 2-13, preferably extruded directly onto the unbarbed end 2-14 of the fish-hook. Within base 2-13 is a frangible link 2-15 which may be made of a thermoplastic material, e.g. polyethylene. Preferably, however, link 2-15 is formed of a length of nylon fish line of preselected tensile strength. The link 2-15 extends to a forward shaft 2-16, which terminates in a four-prong, arrowhead 2-17. The tip 2-18 of the arrowhead 2-17 is provided with a fingerloop ring 2-19 which is molded to a nylon line threader tail 2-20, which terminates in an instruction tag 2-21.

This embodiment however includes a means to anchor a lure snap ring (not shown). Such means may take the form of a flexible arcuate arm 2-40 having an aperture 2-41 at the end thereof; or the form of a rigid arm 2-42, having an aperture 2-43 therein; or the form of an ear 2-44 having an aperture 2-45 therein.

The so-modified fish-hook is secured within a double-open-ended cylindrical retainer 2-30. Cylindrical retainer 2-30 includes a primary well 2-31 (to accommodate base 2-13) and a secondary bore 2-32 (to accommodate forward shaft 2-16). The front face 2-33 of the cylindrical retainer 2-30 includes a circular seating groove 2-34 (to accommodate the bottom ends of the prongs 2-35 of the arrowhead 2-17).

(c) Description of the FIG. 3

The third embodiment of the invention seen in FIG. 3 is similar in most respect to the first embodiment, and where similar parts are described they will be identified by the prefix "3-".

As seen in FIG. 3, the fish-hook coupling and release assembly 3-10 includes a conventional fish-hook 3-11 having an extension 3-12 thereon instead of the conventional eye. The extension 3-12 includes a cylindrical base 3-13, which may be either extruded directly onto the unbarbed end 3-14 of the fish-hook, or, as shown, may be screwed onto a threaded, unbarbed end 3-14 of the fish-hook 3-11. Within base 3-13 is a frangible link 3-15 which may be made of a thermoplastic material, e.g. polyethylene. Preferably, however, link 3-15 is formed of a length of nylon fishline of preselected tensile strength. The link 3-15 extends into a forward cylindrical shaft 3-16, which includes a mid, nipped-in frusto-conical arrowhead 3-17, and a terminal nose 3-18. The nose 3-18 may be rounded, as shown, or it may be pointed. The nose 3-18 is provided with extraction holes 3-19 and a fingerloop ring 3-20 which is molded to a nylon line threader tail 3-21, which terminates in an instruction tag 3-22.

The so-modified fish-hook is secured within a double-openended cylindrical retainer 3-30. Cylindrical retainer 3-30 includes an internal well 3-31 (to accommodate base 3-13 and a portion of shaft 3-16) and a converging, frusto-conical bore 3-32, (to accommodate mid, nipped-in frusto-conical arrowhead 3-17). The front face 3-33 of the retainer 3-30 is flat, to abut the rear, flat edges 3-34 of the nose 3-18, where it joins mid, nipped-in frusto-conical arrowhead 3-17 at waist 3-35. Because of the unhindered, hollow construction of the cylindrical retainer 3-30, the forward end thereof, having the converging frusto-conical bore 3-32 acts as encircling sprung jaws.

This embodiment also includes a means to anchor a lure snap ring (not shown). Such means, as shown, takes the form of a cantelevered arm 3-40 having an aperture 3-41 at the end thereof.

(d) Description of FIG. 4

FIG. 4 shows a portion of a fourth embodiment of this invention, namely an anti-twist device 4-10, the anti-twist device being usable with either of the three embodiments previously described. This anti-twist device 4-10 includes a bore 4-50 through the cylindrical retainer 4-30 and a bore, 4-51 through the base 4-13 of the fish-hook 4-11. A pin 4-52 is passed through aligned bores 4-50 and 4-51 to prevent the fish-hook 4-11 from twisting with respect to the cylindrical retainer.

OPERATION OF EMBODIMENTS OF INVENTION (a) Operation of First and Second Embodiments shown in FIGS. 1 and 2

Installation of the fish-hook into those two embodiment of the cylindrical retainer is a simple matter. First the instructional tag is removed. The threader tail is then inserted into the aft end of the cylindrical retainer and pushed through to the other, forward end. The cylindrical retainer is grasped with one hand, and the threader tail is then pulled through the cylindrical retainer until the finger loop ring appears. When the finger loop ring appears, a finger may be inserted into the loop. Continued pulling will result in the appearance of the arrowhead. Pulling proceeds so that the bottom of the arrow is clear of the cylinder. The fish-hook is pulled back and this will seat the bottom of the arrowhead into the circular retaining well or grove of the cylindrical retainer.

Release may be achieved automatically by a pull by the fish exceeding the tensile strength of the fish line. Alternatively release may be achieved by pulling forwardly of the device until the juncture of the shaft and the arrowhead is seen, at which time this juncture is snipped off, e.g. with a scissors.

(b) Operation of the Third Embodiment Shown in FIG. 3

Installation of the fish-hook into the cylindrical retainer of this embodiment is also a simple matter. First the instructional tag is removed. The threader tail is inserted into the aft end of the cylindrical retainer and pushed through to the other end. The cylindrical retainer is then grasped with one hand, and the threader tail may be pulled through the cylinder until the finger loop ring appears. When the finger loop appears, a finger may be inserted into the loop and continuing to pull will result in the appearance of the nose. Pulling proceeds until the nose expands the encircling sprung jaws provided by the converging frusto-conical bore within the retainer. When the mid waist appears, the mid nipped-in frusto-conical arrowhead is properly seated within the cylindrical retainer, and the encircling jaws then spring shut. The flat end face of the cylindrical retainer then rests against the flat face of the nose.

Release may be achieved automatically by a pull by the fish exceeding the tensile strength of the fish line. Alternatively the cylindrical shaft may be cut with a scissors at the mid waist.

(c) Operation of the Fourth Embodiment Shown in FIG. 4

The holes in the fish-hook cylindrical base are aligned with the holes in the cylindrical retainer, and a pin inserted therein. This prevents excessive twisting of the fish-hook with respect to the cylindrical retainer.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A fish-hook coupling and release device comprising:
   (a) a double-open-ended hollow cylindrical retainer;
   (b) a modified fish-hook having an arrowhead thereon, said arrowhead being capable of passing through the central core of said hollow cylindrical retainer; and
   (c) breakable link means linking said fish-hook to said arrowhead for releasing said arrowhead from said fishhook when a tensile force on said fish-hook exceeds a preset limit.

2. The device of claim 1 wherein said link means comprises a shaft on said arrowhead, said shaft being formed of a frangible material.

3. The device of claim 1 wherein said link means is formed of a length of fish line of desired tensile strength.

4. The device of claim 1 wherein said arrowhead is formed from a thermoplastic material.

5. The device of claim 4 wherein said thermoplastic material is polyethylene or nylon.

6. The device of claim 1 wherein said cylindrical retainer is made of rugged material.

7. The device of claim 6 wherein said rugged material is aluminum or steel.

8. The device of claim 1 wherein said arrowhead includes a thin cylindrical shaft for linking securement to an unbarbed end of said fish-hook.

9. The device of claim 1 wherein said fish-hook is provided with a cylindrical base at its unbarbed end.

10. The device of claim 9 wherein said cylindrical base is molded of nylon directly into the unbarbed end of said fish-hook, wherein a length of nylon fish line is molded into said nylon cylinder, and wherein said length of nylon fish line is molded onto a shaft of said arrowhead.

11. The device of claim 1 wherein said arrowhead includes a thin cylindrical shaft secured to a length of fish line, said fish line being secured to an unbarbed end of the fish-hook.

12. The device of claim 1 wherein said cylindrical retainer includes a first bore of a first diameter, a second bore of lesser diameter, and an end face provided with a circular seating groove.

13. The device of claim 1 wherein said modified fish-hook includes a cylindrical base secured to an unbarbed end of said fish-hook, a forward cylindrical extension provided with a mid, nipped-in frusto-conical arrowhead and a terminal nose, said cylindrical base being secured to said cylindrical extension by a frangible link.

14. The device of claim 13 wherein said cylindrical base is molded of nylon directly into an unbarbed end of said fish-hook, wherein a frangible link comprising a length of nylon fish line is molded into said nylon cylindrical base, and wherein said length of nylon fish line is molded into said cylindrical extension.

15. The device of claim 13 wherein said cylindrical base is molded of nylon and is screwed onto a threaded end of said fish-hook, wherein a frangible link comprising a length of nylon fish line is molded into said nylon cylindrical base, and wherein said length of nylon fish line is molded onto said cylindrical extension.

16. The device of claim 13 wherein said cylindrical retainer includes a main cylindrical base terminating in a converging, frusto-conical base, whereby said terminal end provides encircling, sprung arrowhead-retaining jaws.

17. The device of claim 1 wherein the tip of said arrowhead is provided with a fingerloop ring attached to a threader tail.

18. The device of claim 13, wherein the tip of said nose of said cylindrical extension is provided with a fingerloop ring attached to a threader tail.

19. The device of claim 1 wherein said means of releasing said arrowhead from said fish-hook is determined by the tensile strength of said link means.

20. The device of claim 19 wherein said link is a length of nylon fish line of known tensile strength.

21. The device of claim 1 including means associated with said cylindrical retainer for enabling the securement of the snap ring of a lure thereto.

22. The device of claim 21 wherein said means comprises a flexible arm terminating in an aperture, or a rigid, cantelevered arm terminating in an aperture, or in a rigid forwardly-extending arm terminating in an aperture, or an apertured ear.

23. The device of claim 1 including an anti twist device comprising aligned apertures in said cylindrical retainer and in said modified fish-hook, through which a pin is passed.

* * * * *

UNITED STATES PATENT AND TRADEMARK OFFICE
CERTIFICATE OF CORRECTION

PATENT NO. :   4,848,018

DATED      :   July 18, 1989

INVENTOR(S) :  John F. Clarke

It is certified that error appears in the above-identified patent and that said Letters Patent is hereby corrected as shown below:

Column 4, line 39, at the second occurrence, change "to" to --or--.

Column 5, lines 9 to 11, delete "which is linked to the shank of the fish hook, e.g. by being connected to a length of nylon fish line secured to a nylon cylinder--.

Signed and Sealed this

Twenty-ninth Day of May, 1990

*Attest:*

HARRY F. MANBECK, JR.

*Attesting Officer*                    *Commissioner of Patents and Trademarks*